United States Patent
Degutis et al.

(10) Patent No.: US 8,950,618 B2
(45) Date of Patent: Feb. 10, 2015

(54) METALLIC FLANGE PLATE WITH LINING

(76) Inventors: Alex V. Degutis, La Grange Park, IL (US); William R. Borowski, Palos Park, IL (US); David A. Oestermeyer, Downers Grove, IL (US); Steven J. Vannocken, Romeoville, IL (US); Joshua J. Chesser, Lockport, IL (US); Brian D. Putnam, Woodridge, IL (US)

(*) Notice: Subject to any disclaimer, the term of this patent is extended or adjusted under 35 U.S.C. 154(b) by 638 days.

(21) Appl. No.: 13/251,629

(22) Filed: Oct. 3, 2011

(65) Prior Publication Data

US 2013/0082053 A1  Apr. 4, 2013

(51) Int. Cl.
*F16J 13/18* (2006.01)

(52) U.S. Cl.
CPC ..................................... *F16J 13/18* (2013.01)
USPC ... 220/242; 292/251; 292/256.75; 292/256.5; 292/256.71; 292/241; 220/810; 220/324; 220/378; 220/212; 220/315

(58) Field of Classification Search
USPC ......... 220/241, 242, 324, 378, 810, 212, 315; 292/251, 256, 256.5, 256.71, 256.73, 292/256.75

See application file for complete search history.

(56) References Cited

U.S. PATENT DOCUMENTS

| | | | |
|---|---|---|---|
| 4,767,819 A * | 8/1988 | Yokoyama et al. | 524/587 |
| 5,481,790 A * | 1/1996 | Koreis et al. | 29/428 |
| 6,173,997 B1 * | 1/2001 | Nordstrom et al. | 285/139.1 |
| 6,516,964 B1 * | 2/2003 | Gerhardt et al. | 220/4.14 |
| 6,634,676 B1 * | 10/2003 | Lampson et al. | 285/123.15 |
| 2009/0255703 A1 * | 10/2009 | Vigorito et al. | 174/67 |
| 2011/0295320 A1 * | 12/2011 | Jackson | 606/264 |

* cited by examiner

*Primary Examiner* — Robert J Hicks
*Assistant Examiner* — Kareen Rush
(74) *Attorney, Agent, or Firm* — Leydig, Voit & Mayer, Ltd.

(57) ABSTRACT

A flange plate closure for accessing a containment vessel has a metal base plate, having an interior and an exterior surface, at least one vertical metal tube having an open end, a metal flange ring at said open end defining an upper planar surface, and a lining made of non-corrosive material. The lining is disposed in overlying relation to the interior surface of the base plate, the interior of the tube and the upper planar surface of the flange ring. The lining is rigid, and is mechanically affixed to the metal components. The lining is made of Ultra High Molecular Weight Polyethylene.

24 Claims, 6 Drawing Sheets

METALLIC FLANGE PLATE WITH LINING

BACKGROUND OF THE INVENTION

This disclosure is related to metal flange plates for vessels involved in transport or storage of corrosive liquids. More particularly, it relates to metallic flange plates lined with a rigid non-metallic material impervious to corrosive liquids.

Handling of liquids in various disciplines such as chemical or petroleum processing involves storage, shipment, and transfer of material highly corrosive, or otherwise deleterious, to containment equipment made of metal. Accordingly, it is necessary to isolate the contact surfaces of the equipment from the liquid.

In the past, containment vessels, as well as flow components such as metal tubes and flanges, have been coated with rubber to isolate the contact surfaces from the corrosive liquid. These components are relatively effective, but lack durability under the arduous conditions experienced, for example, in transporting the corrosive liquid by rail or tractor trailer truck.

The rubber at the flanges and tubes is more readily susceptible to deterioration than the rubber inside the containment vessel. The enhanced likelihood of deterioration can be attributed to the frequent attachment and removal of piping components and rapid flow of corrosive liquid through the piping elements during loading and unloading.

Moreover, rubber may often harden when exposed to certain chemicals, such as hydrochloric acid (HCl), which can lead to cracks in the rubber exposing the underlying corrosive surface. When the rubber coating does experience excessive wear or failure, repair of damaged rubber coating is an expensive and time consuming process that involves scraping the rubber coating off of the metal components and then applying a new rubber coating to the metal.

BRIEF SUMMARY OF THE INVENTION

The flange plate of the present disclosure provides the necessary protective interface for corrosive liquid and obviates the need for coating the metal components with rubber. The flange plate includes a lining of material resistant to corrosive liquid which is self supporting or rigid and which is mechanically affixed in overlying relation to the contact surfaces susceptible to the deleterious effects of the liquid product. In particular, these surfaces are covered with Ultra High Molecular Weight Polyethylene. This cover is mechanically secured to the metal surfaces susceptible to deterioration. This material is unaffected by the corrosive liquid. It also permits application of the requisite clamping forces on torque to associated clamping bolts permitting use of high strength gaskets between clamped surfaces.

DETAILED DESCRIPTION OF THE ILLUSTRATED EMBODIMENTS

Figure 1:
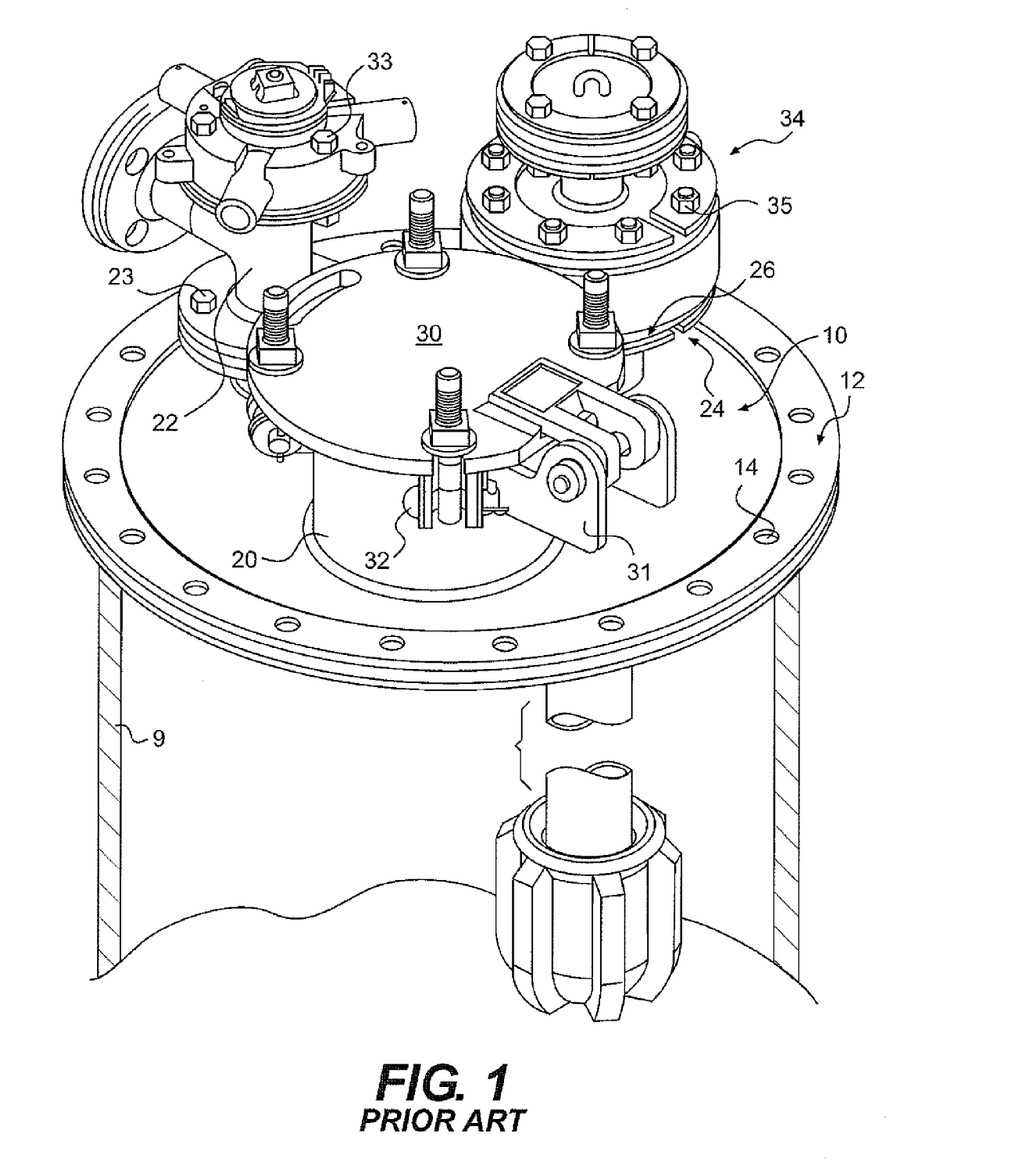
FIG. 1 is a perspective view of a conventional flange plate arrangement for a containment vessel such as a railroad tank car.

Turning now to the drawings, a conventional flange plate arrangement for a containment vessel such as a railroad or vehicular tank car is illustrated in FIG. 1. The flange plate arrangement can be coupled to an access opening into the car. The flange plate arrangement provides access into the vessel to withdraw liquid from, or deliver liquid to, the lading compartment or containment vessel.

FIG. 1 illustrates a flange plate arrangement for a railroad tank car used in transporting corrosive liquid such as hydrochloric acid (HCl). The containment vessel comprises a tank with one or more access ports or hatches to facilitate loading and unloading.

A typical vessel includes a vertical cylindrical tubular cowling generally illustrated at 9 in FIG. 1 that defines an access opening into the vessel. It includes an annular bolt flange at its upper end to receive a flange plate or closure.

A circular flange plate closure 10 is secured to the bolt flange about its outer periphery in fluid tight relation. Such a tank, could, of course, be part of a vehicle, a stationary storage vessel or any similar containment for corrosive liquid.

The tank and tubular cowling 9 are made of metal and have a rubber coating bonded to the surface to protect against the corrosive effects of the liquid being transported or stored. The metal flange plate closure 10 is similarly protected by a bonded layer of rubber or similar material. A steel segmented washer 12 with bolt holes 14 is used to connect the flange plate 10 to the flange at the open end of the cowling of the vessel. The segmented washer distributes the compressive load of clamping bolts within holes 14 about the perimeter of the flange plate closure to reduce damage to the rubber coating. It should be appreciated that reference to bolts, securement bolts, or clamping bolts includes a traditional threaded bolt-nut combination, pivotal eye bolts, threaded studs secured in a flange plate with threaded holes or any other suitable fastener.

The flange plate closure 10 illustrated in FIG. 1 includes a base plate and tubular elements surrounding suitably formed holes in the base plate that define multiple access ports generally designated 20, 22 and 24. These ports provide a variety of options for access to the interior of an associated vessel.

Illustrated port 20 is a fill port. It defines an access opening into the vessel or tank through which corrosive liquid lading is loaded. It includes a hinged cover 30 pivotally supported on brackets 31 and secured in a closed position by a series of eye bolts 32. The hinged cover 30 also provides for general access into the interior of the tank.

Tube tee 22 represents another access port. It supports a safety vent assembly 33 connected by securement bolts 23.

Access port 24 can support an eduction tube assembly 34 seen in FIG. 1. Access port 24 includes a vertical tubular portion defining an access passage to receive eduction tube assembly 34. It includes an attachment flange 26 at its top which includes a plurality of equally spaced bolt holes to receive securement bolts.

It should be noted that the various bolted together flanges shown or described as well as the joints between the upper surface of tubular coupling and under surface of flange plate 10 represent leakage paths. Therefore, appropriate sealing gaskets are usually provided between the mating planar surfaces of the clamped together components to ensure a fluid tight connection.

Figure 2:
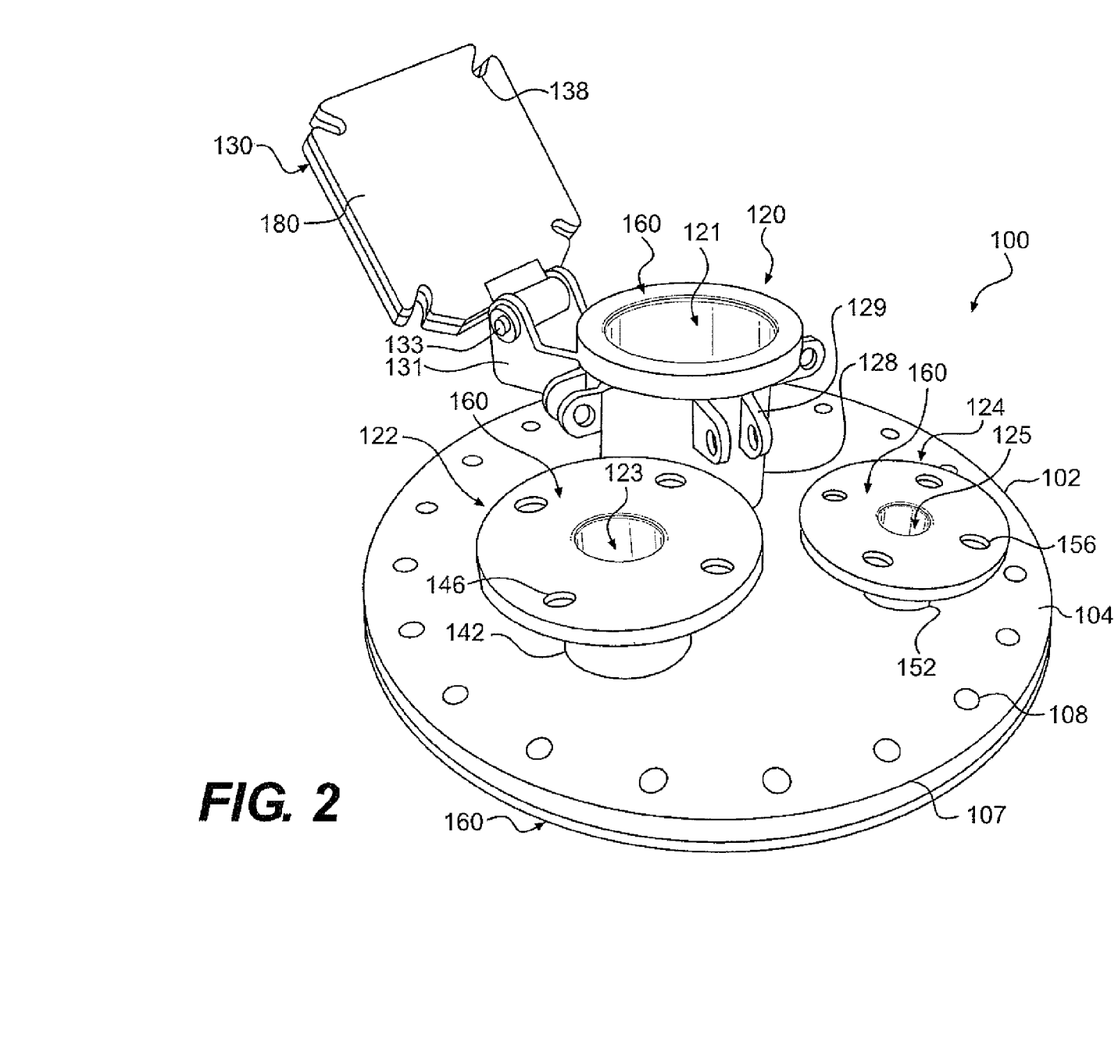
FIG. 2 is a perspective view of a flange plate closure arrangement in accordance with the disclosure having a mechanically affixed, non-metallic rigid lining.
Figure 3:
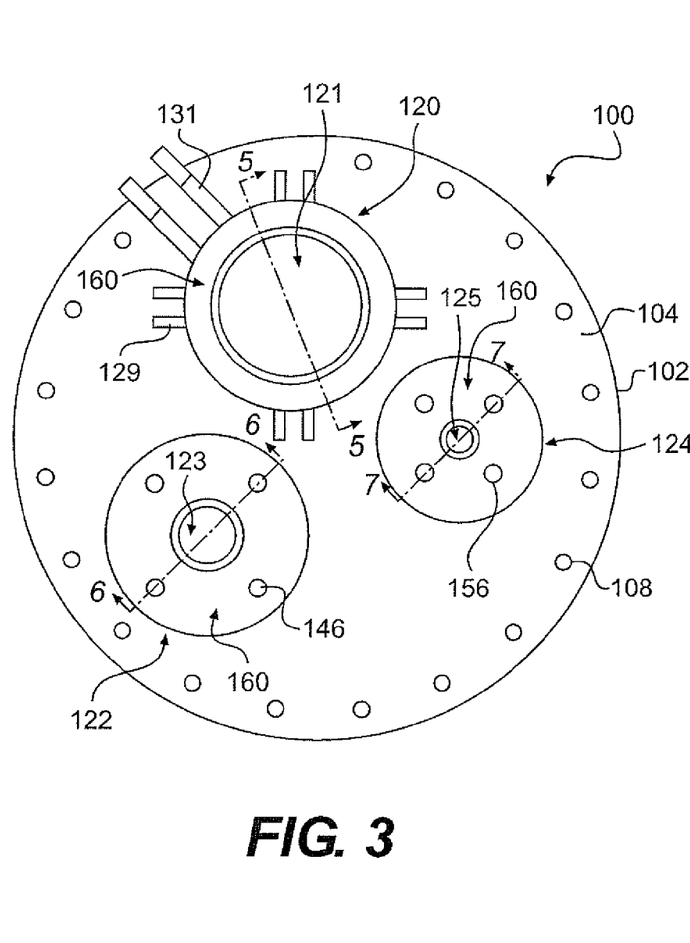
FIG. 3 is a top plan view of the flange plate closure of FIG. 2.
Figure 4:
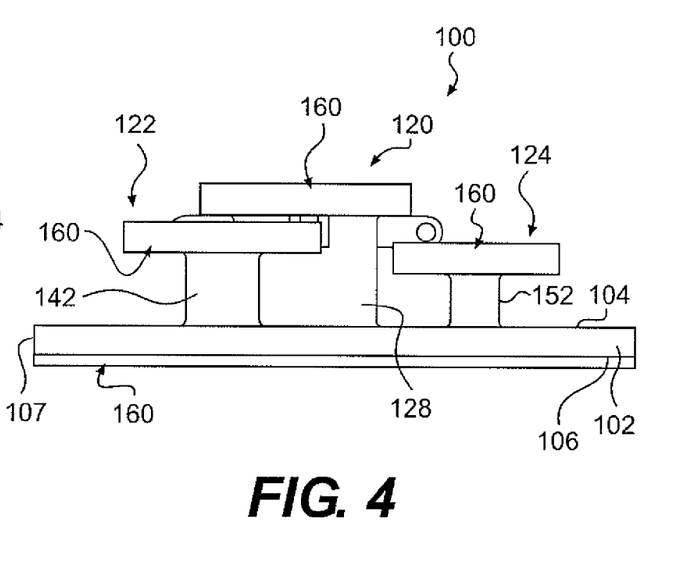
FIG. 4 is a side view of the flange plate closure of FIG. 2.

Referring now to FIGS. 2-4, a flange plate closure 100 of the present disclosure including a mechanically affixed rigid non-metallic liner material is shown. Flange plate closure 100 is intended to be used to close a containment vessel entry opening such as a vertical cylindrical tubular cowling 9 as illustrated in FIG. 1.

The flange plate closure 100 includes a metallic base plate 102 and attached tubular elements defining multiple access ports generally designated 120, 122, 124 surrounding appropriately formed holes in base plate 102. The flange plate closure 100 attaches to a tubular cowling such as the tubular cowling 9 of the associated containment vessel. A plurality of bolt holes 108 are equally spaced adjacent perimeter edge 107 of base plate 102 to receive securement bolts as described in connection with the flange plate closure 10 of FIG. 1.

Illustrated port 120 is a fill port. It defines an access opening 121 into the associated vessel through which corrosive liquid lading is loaded. Access port 122 is a general access port and defines an access opening 123. It can support an eduction tube assembly such as shown in FIG. 1 or other suitable attachment, which is received in an access opening. Tube tee port 124 represents another access port providing an access opening 125 into the containment vessel. The tube tee port 124 can support a safety vent assembly or other suitable attachment.

It will be appreciated that the flange plate closure 100 includes any suitable number of ports of any suitable shape and size. Its function is to provide a means for connection of various associated safety, fluid handling and monitoring elements of a fluid handling system to the interior of the containment vessel. In this regard, the configuration disclosed is merely exemplary and not limiting. Any number and arrangement of access ports is employed. The significant arrangement of the disclosure is the provision of a mechanically coupled protective liner of rigid non-corrosive protective material.

Base plate 102 is a essentially steel fabrication. It includes an exterior or upper surface 104 and interior surface 106 that faces the interior of the containment vessel when flange plate closure is installed on a cowling such as cowling 9 of FIG. 1. All surfaces may be painted, or even covered with a layer of rubber, though such is not essential.

In accordance with this disclosure, all surfaces of base plate 102, susceptible of contact with corrosive liquid, are provided with a protective lining, generally designated 160, formed of a rigid corrosion impervious material mechanically joined to the base plate 102. In this disclosure, the protective lining is made of Ultra High Molecular Weight Polyethylene (UHMWP).

Figure 5:
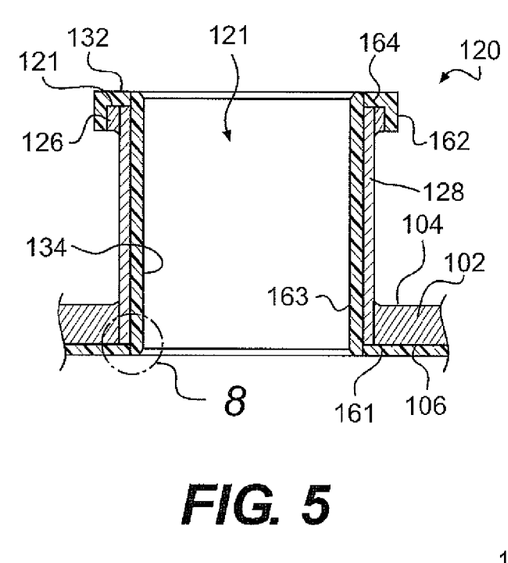
FIG. 5 is a fragmentary sectional view of a portion of the flange plate closure taken through line 5-5 in FIG. 3.
Figure 6:
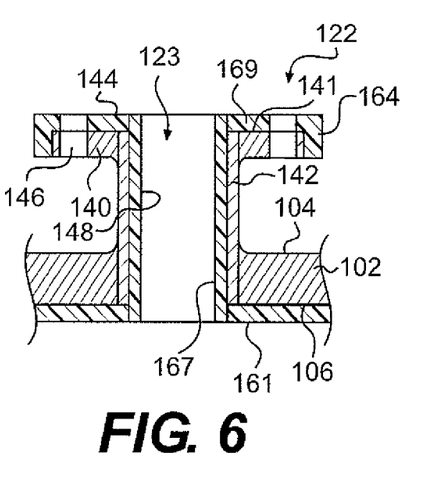
FIG. 6 is a fragmentary sectional view of another portion of the flange plate closure taken through line 6-6 in FIG. 3.
Figure 7:
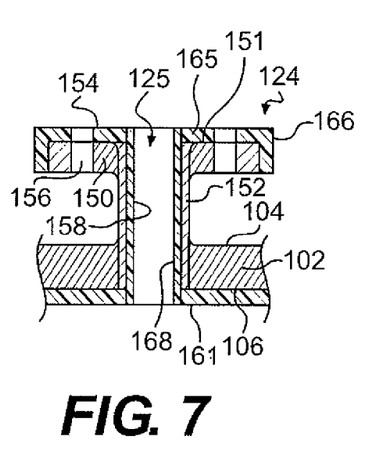
FIG. 7 is a fragmentary sectional view of a further portion of the flange plate closure taken through line 7-7 in FIG. 3.

Best seen in FIGS. 5 to 7, the access ports 120, 122, 124 are formed by vertical metal tubes 128, 142, and 152 welded to base plate 102 in appropriately sized holes or apertures. Tubes 128, 142, and 152 includes metal flange rings 126, 140, and 150 welded respectively to each tube at its upper terminus forming a radial flange. These components form the metallic structural skeleton of the tank flange closure 100. Since they are formed of metal it is necessary to isolate this structural component from the effects of the corrosive liquid being stored or transferred in the associated containment vessel. That role is the function of the lining 160 which as explained below, is mechanically connected to the sub-assembly of base plate 102, tubes, 128, 142, 152 and flanges 126, 140 and 150 in overlying protective relation to potential liquid contact surfaces. Lining 160 as described in detail below is comprised of connected components unaffected by the corrosive lading. In this disclosure the lining 160 is made of components formed of Ultra High Molecular Weight Polyethylene. The components are secured to each other to enclose the base plate and associated metal structure.

Referring to FIGS. 2-5, the fill port 120 includes vertical metal tube 128 secured in a hole in base plate 102. The interior of the tube 128 defines an access conduit into an associated containment. A flange ring 126 is at upper end of tube 128. The flange ring 126 defines upper planar surface 127. It is generally annular and extends radially from the vertical tubular portion 128 at its upper terminus.

Support brackets 131 and spaced vertical locking lugs 129 are secured to tube 128 and a hinged closure cover 130 is supported on brackets 131. The flange ring 126, vertical tubular portion 128, and base plate 102 can be distinct components that have been welded together (such as shown in FIG. 5) or two or more of these components can be integrally formed as a single component.

As shown in FIGS. 2-4 and 6, the access port 122 includes vertical metal tube 142 secured in a hole in base plate 102 of flange plate closure 100 The interior of the tube 128 defines an access conduit into an associated containment but its tube 1423 a radial flange ring 140 is at the upper terminus of tube 142. The flange ring 140 defines upper planar surface 141. It can be generally annular and extends radially from the vertical tubular portion 142 at its upper terminus surrounding the entrance of the access opening 123. The flange ring 140 includes a plurality of holes 146 to receive fasteners for securing the suitable attachment. The flange ring 140, vertical tubular portion 142, and base plate 102 can be distinct components that have been welded together (such as shown in FIG. 6) or two or more of these components can be integrally formed as a single component.

Referring to FIGS. 2-4 and 7, the tube tee port 124 includes a vertical metal tube 152 secured in a hole in base plate 102 of flange plate closure 100. The interior of the tube 128 defines an access conduit into an associated containment but its tube 152. It includes radial flange ring 150 at its upper terminus which is generally annular and defines upper planar surface 151 and extends radially from the vertical tubular portion 152 surrounding entrance of the access opening 125. The flange ring 150, vertical tubular portion 152, and base plate 102 can be distinct components that have been welded together (such as shown in FIG. 7) or two or more of these components can be integrally formed as a single component.

Figure 9:
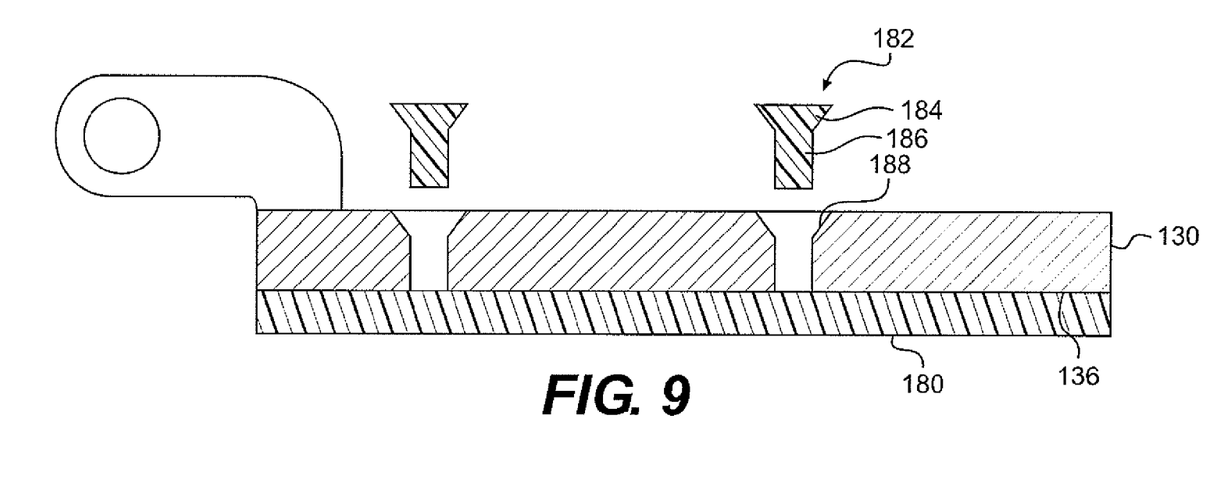
FIG. 9 is a sectional view of the pivotable closure cover of the flange plate closure shown in FIG. 2.

Referring to FIGS. 2 and 9, the hinged closure cover 130 of fill port 120 is made of a metal plate. It is supported on support bracket 131 by hinge pin 133. It is generally planar and is sized to completely cover the access opening 121. The hinged closure cover 130 has a plurality of corner notches 138 for receiving eye bolts which when tightened secure the hinged closure cover 130 in a closed position overlying access opening 121 to seal access opening. In the open position, the hinged closure cover 130 pivots away from the access opening 121 on pin 133. Access into the interior of the containment vessel is provided when the eye bolts have been released and the hinged closure cover 130 has been pivoted away from the access opening 121 to the open position. It will be appreciated that the hinged closure cover 130 has any suitable compatible shape and can attach to the fill port 120 in any suitable manner.

In accordance with the present disclosure, protection of the flange plate closure 100 from exposure to and damage from corrosive liquids, is provided by lining 160 which overlies all surfaces of the flange plate closure 100 that are subject to exposure to the liquid. Accordingly, as best seen in FIGS. 4-8, the surface 106 of base plate 102 of flange plate closure 100 is substantially covered by lining disc portion 161 of the durable and chemically resistant protective lining 160. The material is Ultra High Molecular Weight Polyethylene.

The lining disc portion 161 is disposed in overlying relation to and closely fitted to the interior surfaces 106 it is intended to isolate. It is held in place mechanically as will be understood. As shown in FIG. 4, the lining disc portion 161 covers the interior surface 106 of the base plate 102. In use, interior surface 106 would otherwise be exposed to corrosive liquid within the containment. That is, the lining disc portion 161 is sized to have a diameter nearly as large as the diameter of the outer perimeter edge 107 of base plate 102 so that it rests on the upper surface of a tubular cowling of a containment vessel such as the tubular cowling 9 of FIG. 1.

Referring to FIG. 5, the lining 160 also covers affected surfaces of the fill port 120. As shown, a tubular portion 163 of the lining 160 extends from the lining disc portion 161 and defines interior surface 134 of the fill port 120 and forms an access conduit for fluid to enter into the interior of the containment vessel. An annular flange portion 164 overlies upper flange ring 126 and includes a planar seal surface 132 on which the hinged closure cover 130 is supportable to seal the access opening 121 when the hinged closure cover 130 is pivoted into a closed position.

The non-metallic portions are secured together by spin welding or other processes to form an integral lining structure. In cross section, as in FIGS. 5-9, the lining 160 generally forms a spindle-like shape. That is, disc portion 161 is secured to one end of tubular portion 163 and flange portion 164 is secured to the other end. In this manner, the lining cannot be dislodged from base plate 102. The spindle-like shape retains the lining 160 to the flange plate closure 100. Thus, the lining 160 is connected without directly adhering it to the flange plate closure 100.

In addition, as shown, the flange portion 164 of lining 160 has a depending lip portion 162 extending beyond and overlying the perimeter edge of the flange ring 126. The lip portion 164 protects the perimeter edge of flange ring 126 from any corrosive liquid that may spill over the flange ring 126. The lip also protects the lining from being damaged by tools or other equipment that makes contact with the flange portion 164.

Similarly, referring to FIG. 6, the lining 160 covers affected surfaces of the access port 122. As shown, a tubular portion 167 of the lining 160 extends from the lining disc portion 161 and defines interior surface 148 of the access port 122 and forms a conduit into the interior of the containment vessel. An annular flange portion 169 overlies upper flange ring 140 and defines a planar seal surface 144 on which any suitable attachment may be secured in fluid tight relation. It includes holes aligned with bolt holes 146 of flange ring 140.

Again, the lining 160 generally forms a spindle-like shape. The spindle-like shape helps to retain the lining 160 to the flange plate closure 100. Thus, the lining 160 can be attached without directly adhering it to the flange plate closure 100. In addition, the lining 160 has a lip 164 extending around the perimeter of the flange ring 140 to protect the perimeter from any liquid that may spill over the flange ring 140.

Likewise, referring to FIG. 7, the lining 160 is used to cover affected surfaces of the tube tee port 124. As shown, a tubular portion 168 of lining 160 extends from the lining disc portion 161 and defines interior surface 158 of access port 124 and forms a conduit into the interior of the containment vessel. An annular flange portion 165 overlies upper flange ring 150 and defines a planar seal surface 154. It includes bolt holes aligned with bolt holes 156 of flange ring 150.

In this embodiment, the lining 160 generally forms a spindle-like shape. The spindle-like shape helps to retain the lining 160 to the flange plate closure 100. Thus, the lining 160 can be attached without directly adhering it to the flange plate closure 100. In addition, the lining 160 has a lip 166 extending around the perimeter of the flange ring 150 to protect the perimeter from any liquid that may spill over the flange ring 150.

The portions of the lining 160 covering surfaces of each of the various ports on the flange plate closure 100 are separately formed pieces that are attached to one another, such as by spin welding, friction welding or sonic welding at the respective intersections of the segments of the lining 160 for each of the surfaces of the ports and the base. In other embodiments, portions of the lining 160 are formed such that they are each able to cover more than one of the various surfaces of the flange plate closure 100. It will be appreciated that any desired surfaces of the flange plate closure 100 can be covered by the lining 160.

Notably, because the metal flange rings of the flange plate closure assembly 100, for example flange rings 126, 140 and 150 are covered with flange portions 164, 165 and 169, it is possible to employ high strength gaskets upon planar sealing surfaces 132, 144 and 154. Such gaskets will not yield to high torques required to clamp associated equipment to the access ports and will ensure a fluid tight seal.

Figure 8:
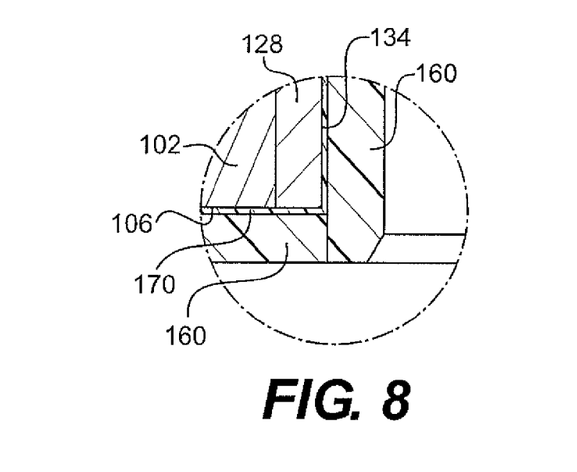
FIG. 8 is an enlarged fragmentary sectional view of a portion of the flange plate closure of FIG. 5.

As shown in FIG. 8, a further material 170 may be disposed between the flange plate closure 100 and the lining 160. The further material 170 may, for example, be a rubber material. In some embodiments, the further material 170 is present when the lining 160 is retrofitted to a flange plate closure 100 already provided with a particular coating. In other embodiments, the further material 170 could be an adhesive for restricting movement of the lining 160 with respect to the flange plate closure 100.

Turning to FIG. 9, the hinged closure cover 130 has a cover lining 180 on the metal plate to avoid contact with a liquid stored in the containment vessel. The cover lining 180 may overlay the bottom surface 136 of the metal plate of hinged closure cover 130. The cover lining 180 is attached to the hinged closure cover 130 in any suitable manner. For example, in certain embodiments, one or more attachment pins 182 is used to connect the cover lining 180 to the hinged closure cover 130. The attachment pin 182 has a head 184 and a body 186. The hinged closure cover 130 has one or more corresponding bores 139 passing therethrough. The attachment pin 182 is placed into the bore 139 such that they contact the cover lining 180. In addition, the attachment pin 182 can be made of the same material as the cover lining 180, and the attachment pin can be attached to the cover lining 180 by friction welding each attachment pin body 186 to the cover lining 180. As illustrated, the bore 139 can be surrounded by a countersunk portion, which receives the head 184 and makes the head 184 flush with the hinged closure cover 130. It will be appreciated that the cover lining 180 is attached to the hinged closure cover 130 in any suitable manner.

The lining 160 is constructed of the same material as the cover lining 180. The lining is formed with any suitable material for protecting the flange plate. The lining is rigid such that it is resistant to damage from the frequent attaching and detaching of accessories. For example, the lining is formed from a polyethylene such as ultra high molecular weight polyethylene (UHMWPE, sometimes abbreviated as UHMW), also known as ultra high-modulus polyethylene (HMPE) or high-performance polyethylene (HPPE). UHMW is durable and highly resistant to many corrosive chemicals. It also has extremely low moisture absorption, a very low coefficient of friction, is self lubricating, and highly resistant to abrasion. The lining is formed from a powder molded into a desired shape, or otherwise formed in any suitable manner.

Figure 10:
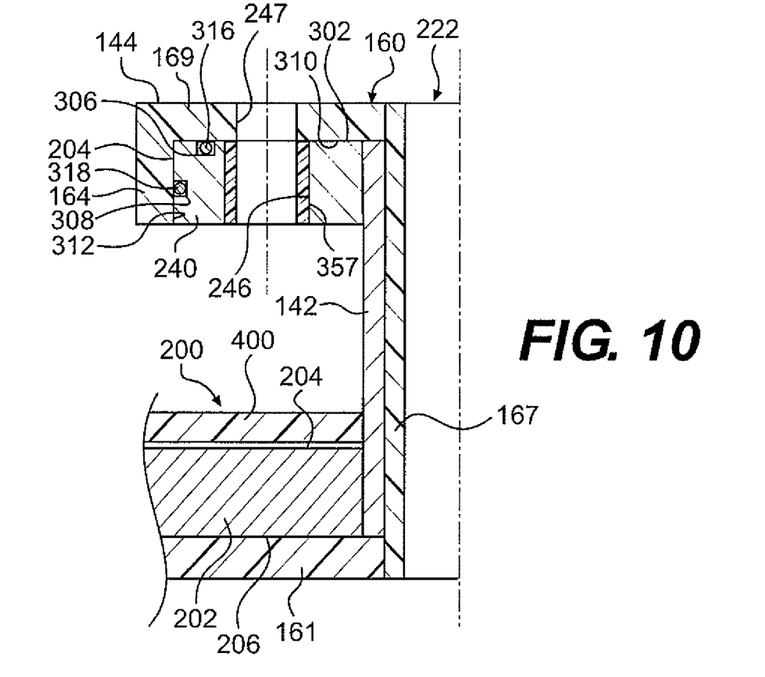
FIG. 10 is a fragmentary sectional view of a modified form of the flange plate closure illustrated in FIG. 2 depicting alternatives to enhance protective qualities.
Figure 11:
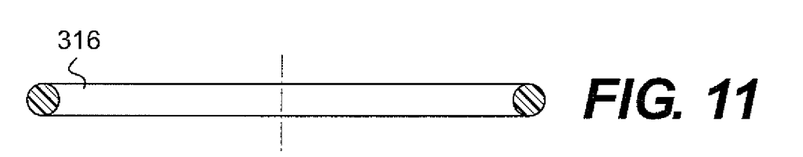
FIG. 11 is a sectional plan view of an O-ring utilized in the flange plate closure configuration of FIG. 10.
Figure 12:
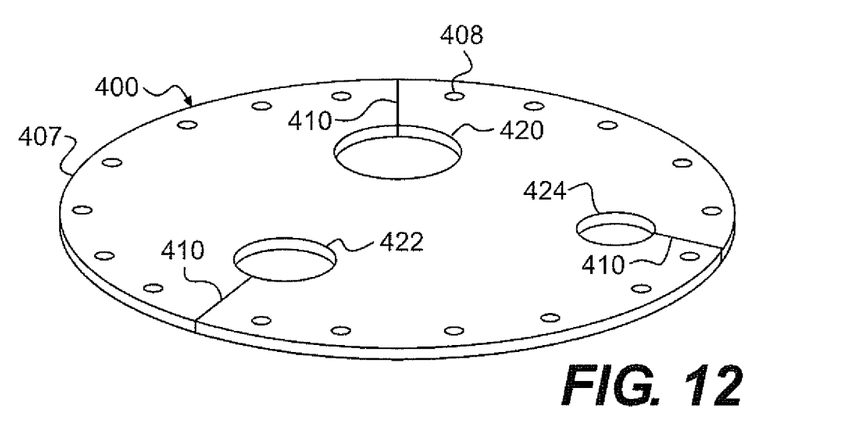
FIG. 12 is a perspective view of a protective overlay for the flange plate closure of FIG. 10.

Turning now to FIGS. 10 to 12, there is illustrated a flange plate closure 200 similar to the flange plate closure of FIG. 2, with modifications to enhance protections against the ingress of corrosive liquids to areas susceptible of deterioration. For purposes of illustration, only a portion of the flange plate closure is shown. The features described are, however, suitable to be employed throughout the entire structure.

FIG. 10 shows a flange plate closure 200 protected by a mechanically affixed lining 160 made of UHMWP. Closure 200 includes a metallic base plate 202 having an exterior or upper surface 204 and interior surface 206.

One or more access ports such as access port 222 illustrated in FIG. 10, extend vertically from base plate 202. For example, as illustrated, port 222 includes vertical metal tube 242 with a metal flange ring 240 at its upper end. It may include a plurality of bores 246 about a bolt circle diameter for connection of an associated component using, for example, bolts 23 seen in FIG. 1.

As illustrated, metal flange ring 240 has an upper planar surface 302 and an outer cylindrical perimeter surface 204. Upper flange surface 302 includes an annular groove 306. Similarly, outer cylindrical perimeter surface 204 includes an annular groove 308.

Lining 160 is configured as described in relation to the metal flange plate 100 of FIGS. 2 to 7. It includes a lining disc portion 161 covering the interior surface 206 of metallic base plate 202 and held in place mechanically as already described in connection with the earlier embodiment.

A tubular portion 167 of lining 160 extends from lining disc portion 161 and forms a conduit into the interior of a containment upon which the flange plate closure 200 is utilized. An annular flange portion 169 overlies upper metal flange ring 240. It defines a planar seal surface 144 on which any suitable attachment may be secured in fluid tight relation. It includes bolt holes 247 aligned with bores 246 in flange ring 240. Annular flange portion 169 includes interior surface 310 that overlies groove 306.

Annular flange portion 169 of lining 160 includes lip 164 extending around the perimeter of metal flange ring 240. It includes interior cylindrical surface 312 that overlies the outer perimeter surface 204 of metal flange ring 240.

A elastomeric O-ring 316 is disposed in groove 306. Similarly an elastomeric O-ring 318 is disposed in groove 308. The O-rings 316 and 318 are sized such that their respective cross-sectional diameters exceed the depth of the O-ring grooves 306 and 308. Thus, upon attachment of annular flange portion 169 by friction welding to tubular portion 167, the O-rings are respectively compressed against interior surface 310 of annular flange portion 169 and interior cylindrical surface 312 of lip 164 creating a fluid tight sealing relationship between these components.

As can be appreciated, the described configuration including grooves 306 and 308 and O-ring seals 316 and 318 may be utilized on all of the access ports, such as ports 120, 122 and 124 of FIG. 2. And it is also readily apparent that one, or both grooves 306 and 308, may be employed with one, or both O-rings 316 and 318, depending on the critical nature of the application.

In this embodiment of flange plate closure 200, the bores 246 on a bolt circle diameter of the metal flange ring 240 are somewhat larger in diameter than the bolt holes 146 in metal flange ring 140 illustrated in the embodiment of FIGS. 2 to 7. Here, an annular sleeve 357 formed of UHMWP is pressed into each bore 246. Each has an axial length coextensive with the thickness of flange ring 240 and has an outer diameter surface slightly larger than its associated bore 246.

Sleeves 357 extend the entire length of bores 246. The interior surface of flange portion 269 rests against the upper edge of sleeves 357. The inner diameter surface of each sleeve is sized to align with a bolt hole 247 in flange portion 169. It defines a bolt hole to receive a securement bolt such as bolts 23 or 35 illustrated in FIG. 1. The sleeves 357 protect the bores 246 in flange ring 240 from contact with corrosive liquid. The sleeves also isolate the bores 246 of metal flange ring 240 from direct exposure to contact from the bolts utilized to connect associated flanged components to the access port 222. This configuration provides protection against abrasion of any coating or layer provided on the metal components such as flange ring 240.

FIG. 12 illustrates a further protective component useful in connection with a lined metal flange plate closure such as flange plate closure 100 of FIG. 2, or flange plate closure 200 of FIG. 10. A semi-flexible lining disc 400 is sized to overlie the entire upper surface 204 of a flange plate base, such as metal base plate 202 of FIG. 10. It is shown in position in FIG. 10.

Disc 400 is made of UHMWP and is relatively thin, about 1/16 inch. It includes holes 420, 422 and 424 sized to surround the access ports of the flange plate closure, such as access port 222 of FIG. 10. It has an outer perimeter edge 407 coextensive with the outer perimeter edge of metallic base plate 202. A plurality of bolt holes 408 align with bolt holes in the base plate.

The lining disc 400 includes radial slots 410. The disc is sufficiently flexible to permit flexure to place it upon upper surface 204 of metallic base plate 202 by deformation of the disc 400 at slots 410. The slots include closely spaced edges to minimize leakage of any corrosive liquid through the slots into contact the upper surface 204 of metallic base plate 202. As an option, suitable adhesive may be employed to permanently affix the flexible disc 400 in place.

Disc 400 is, of course, an optional feature of the flange plate closure. It may be employed in instances where transport of particularly aggressive liquids are involved. O-ring seals 316 and 318 between lining 160 and the flange rings of any of the access ports may be employed, as desired, or eliminated, without affecting the overall usefulness of flange plate closure embodiments described above.

Preferred embodiments of this invention are described herein, including the best mode known to the inventors for carrying out the invention. Variations of those preferred embodiments is apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flange plate closure for coupling to an access opening of a vessel comprising:
   a metallic base plate having an interior surface and an exterior surface;
   at least one metal tube extending from said metallic base plate surrounding an aperture therein defining an internal conduit having an open end;
   a metal flange ring extending radially from the open end of the at least one metal tube spaced from said metallic base plate and connected thereto by said metal tube defining an upper planar surface; and
   a non-corrosive lining mechanically affixed to said metallic base plate overlying said interior surface of said metallic base plate, said upper planar surface of said flange ring and said internal conduit of said at least one metal tube.

2. A flange plate closure as claimed in claim 1 wherein said lining includes a lining disc portion covering said interior surface of said metal base plate, a tubular portion covering the interior surface of said at least one metal tube; and an annular flange portion covering said upper planar surface of said metal flange ring.

3. The flange plate closure of claim 2 wherein the lining is made of ultra high molecular weight polyethylene.

4. The flange plate closure of claim 3 wherein the lining includes a plurality of independent portions that are attached to each other.

5. The flange plate closure of claim 2 wherein said annular flange portion of said lining includes a lip covering a perimeter surface of said metal flange ring.

6. A flange plate closure for accessing a containment vessel comprising:
   a metallic base plate having an interior surface and an exterior surface;
   at least one metal tube extending from said metallic base plate surrounding an aperture therein defining an internal conduit having an open end;
   a metal flange ring extending radially from the open end of the at least one metal tube defining an upper planar surface; and
   a non-corrosive lining mechanically connected to said flange plate closure, overlying said interior surface of said metallic base plate, said upper planar surface of said flange ring and said internal conduit of said at least one metal tube, wherein said lining includes a lining disc portion covering said interior surface of said metal base plate, a tubular portion covering the interior surface of said at least one metal tube; and an annular flange portion covering said upper planar surface of said metal flange ring wherein an O-ring seal is interposed between said metal flange ring and said annular flange portion of said lining at said upper planar surface of said flange ring.

7. A flange plate closure for accessing a containment vessel comprising:
   a metallic base plate having an interior surface and an exterior surface;
   at least one metal tube extending from said metallic base plate surrounding an aperture therein defining an internal conduit having an open end;
   a metal flange ring extending radially from the open end of the at least one metal tube defining an upper planar surface; and
   a non-corrosive lining mechanically connected to said flange plate closure, overlying said interior surface of said metallic base plate, said upper planar surface of said flange ring and said internal conduit of said at least one metal tube, wherein said lining includes a lining disc portion covering said interior surface of said metal base plate, a tubular portion covering the interior surface of said at least one metal tube; and an annular flange portion covering said upper planar surface of said metal flange ring wherein an O-ring seal is interposed between said metal flange ring and said lip of said annular flange portion.

8. A flange plate closure as claimed in claim 6 wherein an O-ring seal is interposed between said metal flange ring and said lip of said annular flange portion.

9. A flange plate closure for accessing a containment vessel comprising:
   a metallic base plate having an interior surface and an exterior surface;
   at least one metal tube extending from said metallic base plate surrounding an aperture therein defining an internal conduit having an open end;
   a metal flange ring extending radially from the open end of the at least one metal tube defining an upper planar surface; and
   a non-corrosive lining mechanically connected to said flange plate closure, overlying said interior surface of said metallic base plate, said upper planar surface of said flange ring and said internal conduit of said at least one metal tube, wherein said lining includes a lining disc portion covering said interior surface of said metal base plate, a tubular portion covering the interior surface of said at least one metal tube; and an annular flange portion covering said upper planar surface of said metal flange ring wherein said metal flange ring includes a plurality of bores on a bolt circle diameter and said annular flange portion includes a plurality of bolt holes aligned with said bores wherein said lining includes a sleeve disposed in each said bore.

10. A flange plate closure as claimed in claim 5 wherein said metal flange ring includes a plurality of bores on a bolt circle diameter and said annular flange portion includes a plurality of bolt holes aligned with said bores wherein said lining includes a sleeve disposed in each said bore.

11. A flange plate closure as claimed in claim 6 wherein said metal flange ring includes a plurality of bores on a bolt circle diameter and said annular flange portion includes a plurality of bolt holes aligned with said bores wherein said lining includes a sleeve disposed in each said bore.

12. A flange plate closure as claimed in claim 7 wherein said metal flange ring includes a plurality of bores on a bolt circle diameter and said annular flange portion includes a plurality of bolt holes aligned with said bores wherein said lining includes a sleeve disposed in each said bore.

13. A flange plate closure as claimed in claim 8 wherein said metal flange ring includes a plurality of bores on a bolt circle diameter and said annular flange portion includes a plurality of bolt holes aligned with said bores wherein said lining includes a sleeve disposed in each said bore.

14. A flange plate closure as claimed in claim 2 wherein said lining includes a disc overlying said exterior surface of said metallic base plate.

15. The flange plate closure of claim 14 wherein the lining is made of ultra high molecular weight polyethylene.

16. The flange plate closure of claim 6 wherein the lining is made of ultra high molecular weight polyethylene.

17. The flange plate closure of claim 7 wherein the lining is made of ultra high molecular weight polyethylene.

18. The flange plate closure of claim 8 wherein the lining is made of ultra high molecular weight polyethylene.

19. The flange plate closure of claim 1 wherein the lining is made of ultra high molecular weight polyethylene.

20. The flange plate closure of claim 1 further comprising a hinged metal cover including a lining made of ultra high molecular weight polyethylene.

21. A flange plate closure for accessing a containment vessel comprising:
    a metallic base plate having an interior surface and an exterior surface;
    at least one metal tube extending from said metallic base plate surrounding an aperture therein defining an internal conduit having an open end;
    a metal flange ring extending radially from the open end of the at least one metal tube defining an upper planar surface; and
    a non-corrosive lining mechanically connected to said flange plate closure, overlying said interior surface of said metallic base plate, said upper planar surface of said flange ring and said internal conduit of said at least one metal tube, wherein said lining includes a lining disc portion covering said interior surface of said metal base plate, a tubular portion covering the interior surface of said at least one metal tube; and an annular flange portion covering said upper planar surface of said metal flange ring, wherein the lining is made of ultra high molecular weight polyethylene wherein the lining includes a plurality of independent portions that are attached to each other wherein said lining on said cover is retained to the hinged metal cover with at least one pin made of Ultra High Molecular Weight Polypropylene.

22. A flange plate closure for accessing a containment vessel comprising:
    a metallic base plate having an interior surface and an exterior surface;
    at least one metal tube extending from said metallic base plate surrounding an aperture therein defining an internal conduit having an open end;
    a metal flange ring extending radially from the open end of the at least one metal tube defining an upper planar surface; and
    a non-corrosive lining mechanically connected to said flange plate closure, overlying said interior surface of said metallic base plate, said upper planar surface of said flange ring and said internal conduit of said at least one metal tube, wherein said lining includes a lining disc portion covering said interior surface of said metal base plate, a tubular portion covering the interior surface of said at least one metal tube; and an annular flange portion covering said upper planar surface of said metal flange ring wherein the lining is made of ultra high molecular weight polyethylene wherein said closure includes a plurality of metal tubes extending from said metallic base plate, each having an open end and having a metal flange ring extending radially from each said open end, each said flange ring defining an upper planar surface, and said lining including a tubular portion covering the interior portion of each said tube, and an annular flange portion covering said upper planar surface of each said metal flange ring.

23. The flange plate closure of claim 22 wherein each said annular flange portion of said lining includes a lip covering a perimeter surface of one of said metal flange rings.

24. A flange plate closure as claimed in claim 23 wherein at least one of said metal flange rings includes a plurality of bores on a bolt circle diameter and said annular flange portion includes a plurality of bolt holes aligned with said bores wherein said lining includes a sleeve disposed in each said bore.

* * * * *

UNITED STATES PATENT AND TRADEMARK OFFICE
CERTIFICATE OF CORRECTION

PATENT NO. : 8,950,618 B2  
APPLICATION NO. : 13/251629  
DATED : February 10, 2015  
INVENTOR(S) : Degutis et al.

It is certified that error appears in the above-identified patent and that said Letters Patent is hereby corrected as shown below:

IN THE CLAIMS

Claim 6 at column 9, line 40, "sunounding" should read -- surrounding --,

Claim 7 at column 9, line 63, "sunounding" should read -- surrounding --.

Signed and Sealed this
Eleventh Day of August, 2015

Michelle K. Lee
*Director of the United States Patent and Trademark Office*